US010144660B2

(12) United States Patent
Deloche et al.

(10) Patent No.: US 10,144,660 B2
(45) Date of Patent: Dec. 4, 2018

(54) SYSTEMS AND METHODS OF PROPERLY ORIENTING POOL AND SPA EQUIPMENT

(71) Applicant: ZODIAC POOL SYSTEMS LLC, Vista, CA (US)

(72) Inventors: Remi Deloche, Toulouse (FR); Thierry Michelon, Toulouse (FR); Hwa Heng, Vista, CA (US); Mark Bauckman, San Marcos, CA (US); Ricky Lo, Carlsbad, CA (US)

(73) Assignee: ZODIAC POOL SYSTEMS LLC, Vista, CA (US)

( * ) Notice: Subject to any disclaimer, the term of this patent is extended or adjusted under 35 U.S.C. 154(b) by 0 days.

(21) Appl. No.: 15/813,498

(22) Filed: Nov. 15, 2017

(65) Prior Publication Data
US 2018/0134587 A1 May 17, 2018

Related U.S. Application Data

(60) Provisional application No. 62/422,100, filed on Nov. 15, 2016.

(51) Int. Cl.
C02F 1/467 (2006.01)
C02F 1/461 (2006.01)
E04H 4/12 (2006.01)
C02F 1/00 (2006.01)
C02F 103/42 (2006.01)

(52) U.S. Cl.
CPC ............ *C02F 1/4674* (2013.01); *C02F 1/008* (2013.01); *C02F 1/46104* (2013.01); *E04H 4/1245* (2013.01); *E04H 4/1281* (2013.01); C02F 2103/42 (2013.01); C02F 2201/46145 (2013.01)

(58) Field of Classification Search
CPC .......................... C02F 1/46104; C02F 1/4674
See application file for complete search history.

(56) References Cited

U.S. PATENT DOCUMENTS

2011/0220516 A1* 9/2011 Finfrock ................... C25B 1/04
205/628
2013/0313204 A1 11/2013 Shalon et al.

FOREIGN PATENT DOCUMENTS

WO 2004108613 12/2004
WO 2005009906 2/2005
WO 2015109187 7/2015

OTHER PUBLICATIONS

International Patent Application No. PCT/US2017/061706, "International Search Report and Written Opinion", dated Jan. 29, 2018, 11 pages.

* cited by examiner

*Primary Examiner* — Nicholas A Smith
(74) *Attorney, Agent, or Firm* — Kilpatrick Townsend & Stockton LLP; Dean W. Russell

(57) ABSTRACT

Equipment and methods facilitating suitable orientation of salt-water chlorinators (SWCs) relative to the gravitational field of the Earth are detailed. So orienting an SWC in this manner reduces risk that the volume defined by its gas trap would not be accessible to hydrogen gas generated by the SWC in use. An accelerometer may be employed in connection with the SWC to assist in assessing orientation of the SWC relative to the gravitational field of the Earth.

10 Claims, 2 Drawing Sheets

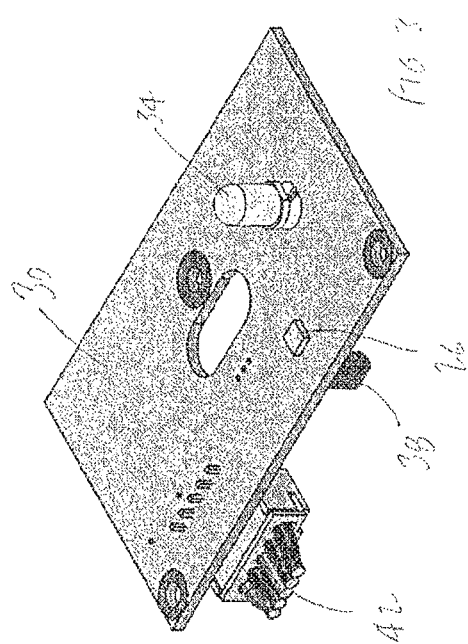

SYSTEMS AND METHODS OF PROPERLY ORIENTING POOL AND SPA EQUIPMENT

CROSS-REFERENCE TO RELATED APPLICATION

This application claims the benefit of and priority to U.S. Provisional Patent Application Ser. No. 62/422,100, filed Nov. 15, 2016, and having the same title as appears above, the entire contents of which application are hereby incorporated herein by this reference.

FIELD OF THE INVENTION

This invention relates to equipment and techniques for correctly orienting pool and spa equipment and more particularly, although not necessarily exclusively, to such equipment and techniques for properly installing salt-water chlorinators (SWCs) relative to the gravitational field of the Earth.

BACKGROUND OF THE INVENTION

Accelerometers have been posited for use with certain equipment used in connection with swimming pools and spas. For example, U.S. Pat. No. 8,771,504 to Mastio, et al., describes placing an accelerometer on an automatic swimming pool cleaner. U.S. Pat. No. 9,034,193 to Shalon, moreover, mentions including an accelerometer as part of a chemical dispensing unit for a spa. The accelerometer of the Shalon patent may be used to sense a change in water level within a spa or whether the unit has been detached from the spa wall.

U.S. Pat. No. 4,439,295 to Richards discloses one of many conventional examples of an SWC. Noted in the Richards patent is that the SWC includes a gas trap in which chlorine is mixed with water. In the trap, chlorine gas is dissolved in the water with which it is mixed before the water is returned to an associated pool. In conventional SWCs, gas traps also may be used to house hydrogen gas during periods of low water flow therethrough to minimize potential accumulation of hydrogen gas in filters or elsewhere within water-circulations systems of pools and spas.

SUMMARY OF THE INVENTION

Proper orientation of an SWC relative to the gravitational field of the Earth is sometimes important in ensuring correct functioning of its gas trap. Conventionally, installation manuals included with SWCs may provide instruction as to how to orient the products during installation in water-circulation systems of pools and spas. The SWCs themselves may contain orientation warnings on their exterior housings. At present, though, commercially-available SWCs lack any means for providing feedback to installers as to whether they are oriented properly relative to gravity.

The present invention seeks to resolve this issue by providing such orientation feedback to installers, users, inspectors, or other interested parties. In particular, an accelerometer may be fixed on or in an SWC. Also included within an SWC may be firmware pre-set to recognize proper orientation of the SWC relative to the Earth's gravity. Indicating means, such as a light-emitting diode (LED), may provide indication that an installed SWC is oriented appropriately.

In at least some versions of the invention, the accelerometer and associated firmware may be attached to at least one printed circuit board (PCB) within the SWC. The accelerometer itself may be any appropriate such device, including—but not limited to—the device detailed in the Shalon patent. The firmware may be factory programmed and control activation of the indicating means when the SWC is oriented consistent with the programmed values. In some embodiments, the firmware may control operation of the SWC itself, so that the SWC could remain inoperative until properly installed. Firmware settings may be saved in non-volatile memory so as to be available when, for example, power is provided to the SWC.

It thus is an optional, non-exclusive object of the present invention to provide means for facilitating proper orientation of an SWC relative to the gravitational field of the Earth.

It is an additional optional, non-exclusive object of the present invention to provide electronic means for facilitating such proper orientation of an SWC.

It is another optional, non-exclusive object of the present invention to provide an accelerometer to facilitate such proper orientation of an SWC.

It is, moreover, an optional, non-exclusive object of the present invention to provide, for an installer, an indicator as to whether an SWC is installed properly relative to the gravitational field of the Earth.

It is an additional optional, non-exclusive object of the present invention to provide a visual indicator, such as an LED, to identify whether an SWC is installed in an appropriate orientation.

It is a further optional, non-exclusive object of the present invention to provide means for preventing operation of an SWC if it is not suitably oriented relative to the gravitational field of the Earth.

It is yet another optional, non-exclusive object of the present invention to provide methods for installing SWCs in water-circulation systems of swimming pools or spas.

Other objects, features, and advantages of the present invention will be apparent to those skilled in the art with reference to the remaining text and the drawings of this application.

BRIEF DESCRIPTION OF THE DRAWINGS

FIG. 3 is a perspective view of the exemplary PCB present in the portion "A" of FIG. 2.

DETAILED DESCRIPTION

Figure 1:
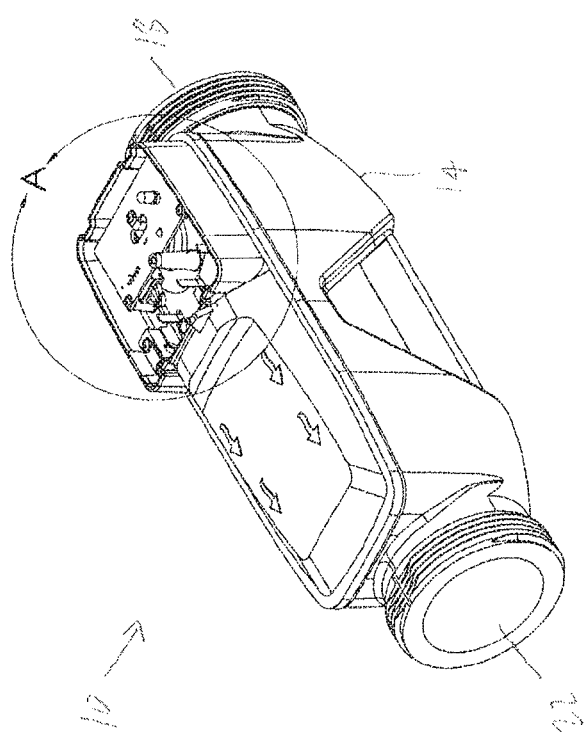
FIG. 1 is a perspective view of an exemplary SWC with part of its housing removed to illustrate certain components therein.

Depicted in FIG. 1 is exemplary SWC 10 consistent with the present invention. SWC 10 may include a body or housing 14 defining inlet 18 and outlet 22. SWC 10 is configured to be plumbed or otherwise connected into a water-circulation system of a swimming pool or spa, such that water from the pool flows, under influence of a pump, into inlet 18 and exits via outlet 22. An electrolysis cell within housing 14 operates on salt dissolved in the water so as to create chlorine, a sanitizing agent.

Hydrogen gas also is generated during electrolysis. Normally, the pump produces sufficient water flow such that the hydrogen gas may travel through the circulation system into the pool or spa, where it is exposed to the ambient environment and dissipates. However, should the pump cease operation, or should water flow through the circulation system diminish substantially, hydrogen gas may tend to accumulate within SWC 10 (or in neighboring components of the system). Accordingly, housing 14 of SWC 10 may include an internal gas trap in the form of a volume of space in its upper portion configured to accommodate some hydrogen gas not immediately able to flow through the system. Although not shown in FIG. 1, a low-flow sensor typically cooperates with the gas trap to provide an indication that gas is accumulating therein.

Hydrogen gas is lighter and less dense than water. Consequently, it tends to rise to the upper portion of housing 14 while the water therein migrates to the lower portion of the body 14. If SWC 10 is not oriented appropriately relative to the gravitational force of the Earth, the gas trap of housing 14 might not be accessible to the hydrogen gas. This result would render the gas trap useless in terms of its ability to accommodate that generated gas.

Figure 2:
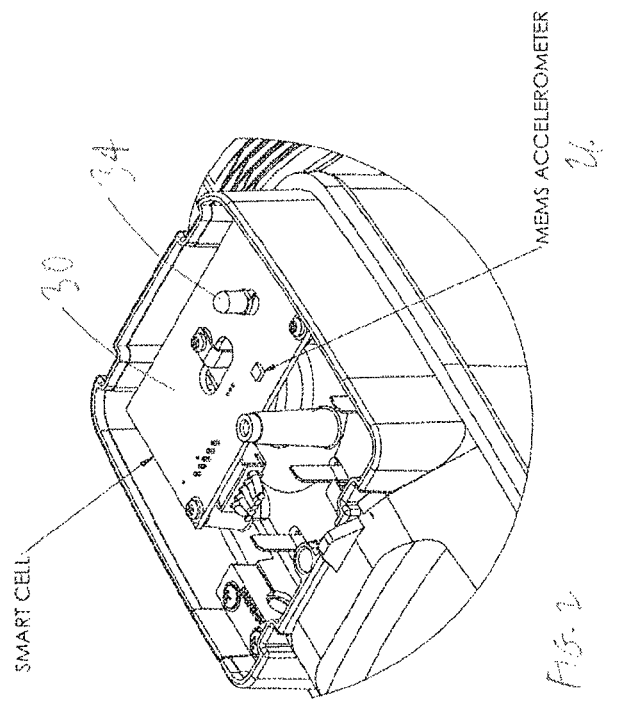
FIG. 2 is a perspective view of the portion "A" of the SWC of FIG. 1.

Illustrated in FIGS. 2-3 is accelerometer 26 of the present invention. Accelerometer 26 may be any electromechanical device that measures acceleration forces such as (but not necessarily limited to) the static force of gravity of the Earth. Deviation of measured acceleration from standard for Earth's gravity may be used to determine that an object is tilted in some manner.

Accelerometer 26 may be or comprise an integrated circuit resident on PCB 30 and may, but need not, be a micromachined microelectromechanical system (MEM) device. PCB 30 additionally may be mounted within body 14 and comprise a microprocessor communicating with accelerometer 26. Alternatively, information from accelerometer 26 may be transmitted elsewhere for processing.

Also included within SWC 10 may be firmware pre-set to recognize proper orientation of the SWC 10 relative to the Earth's gravity. As shown in FIG. 3, PCB 30 further may, if desired, include temperature sensor 38. Wire connectors 42 also may be present as part of PCB 30 to supply power to the components thereon and transfer data from (and possibly to) the PCB 30.

If SWC 10 is properly installed, accelerometer 26 preferably will be oriented more or less horizontally relative to the ground with the gas trap in the upper portion of body 14. By contrast, if accelerometer 26 is tilted more than a predetermined amount from the horizontal, SWC 10 will be deemed improperly installed. One presently-preferred range of acceptable tilt of body 14 is ±100, although persons skilled in the art may consider other ranges to be acceptable. In any event, inverted installation of SWC 10 will result in tilt of approximately 180°, substantially outside any acceptable tilt range.

If orientation of an installed SWC 10 is acceptable, the acceptable installation may be indicated to the installer. LED 34, for example, may provide an exemplary visual indication by illuminating (perhaps with green light) when SWC 10 is suitably oriented. Other indicators may certainly be used instead.

The foregoing is provided for purposes of illustrating, explaining, and describing embodiments of the present invention. Modifications and adaptations to these embodiments will be apparent to those skilled in the art and may be made without departing from the scope or spirit of the invention. As an example of one such modification, pool or spa equipment other than SWCs may include the accelerometer and associated firmware and either provide indication when the equipment is oriented in a particular manner or fail to function when it is not so oriented (or both). Also, although "swimming pool" and "spa" are sometimes used separately, any reference to "swimming pool" or "pool" herein may include a spa, hot tub, or other vessel in which water is placed for swimming, bathing, therapy, or recreation. The entire contents of all of the Mastio, Shalon, and Richards patents are incorporated herein by this reference.

What is claimed is:

1. A salt-water chlorinator configured to be installed in a water-circulation system of a pool or spa, comprising:
    a. a body defining a water inlet and a water outlet;
    b. an electrolysis cell positioned within the body; and
    c. means, comprising an accelerometer, for determining orientation of the body relative to the gravitational force of the Earth as installed in the water-circulation system.

2. A salt-water chlorinator according to claim 1 in which the body has an upper portion defining an internal gas trap, further comprising means for indicating that the internal gas trap, as installed, is oriented as to be accessible to hydrogen gas generated during operation of the salt-water chlorinator.

3. A salt-water chlorinator according to claim 2 in which the means for indicating is responsive to at least one measurement made by the accelerometer.

4. A salt-water chlorinator according to claim 3 in which the means for indicating comprises a light configured to illuminate when the accelerometer measures a tilt of the body relative to ground of no more than ±10°.

5. A salt-water chlorinator according to claim 4 further comprising means for preventing operation of the electrolysis cell when the accelerometer measures a tilt of the body relative to the gravitational force of the Earth of greater than ±10°.

6. A method of installing a salt-water chlorinator in a water-circulation system of a pool or spa, comprising:
    a. connecting an inlet and an outlet of a body of the salt-water chlorinator to other components of the water-circulation system; and
    b. evaluating an indicator of the body whose status is responsive to at least one measurement made by an accelerometer of the body.

7. A method according to claim 6 further comprising adjusting orientation of the salt-water chlorinator relative to the gravitational force of the Earth so as to change the status of the indicator.

8. A method according to claim 6 in which the at least one measurement made by the accelerometer of the body is used to determine whether the body is tilted.

9. A method of installing a. salt-water chlorinator in a water- circulation system of a pool or spa, comprising:
    a. connecting an inlet and an outlet of a body of the salt-water chlorinator to other components of the water-circulation system; and
    b. evaluating an indicator whose status is responsive to at least one measurement made by an accelerometer on the body.

10. A method of installing a salt-water chlorinator in a water-circulation system of a pool or spa, comprising:
    a. connecting an inlet and an outlet of a body of the salt-water chlorinator to other components of the water-circulation system; and
    b. evaluating an indicator whose status is responsive to at least one measurement made by an accelerometer in the body.

* * * * *